United States Patent
Simcik et al.

(10) Patent No.: US 10,294,071 B2
(45) Date of Patent: May 21, 2019

(54) ELEVATOR ACTIVITY LEVEL MANAGEMENT OF MOBILE DEVICE ACCESS

(71) Applicant: OTIS ELEVATOR COMPANY, Farmington, CT (US)

(72) Inventors: Paul A. Simcik, Southington, CT (US); Bradley Armand Scoville, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 188 days.

(21) Appl. No.: 15/337,671

(22) Filed: Oct. 28, 2016

(65) Prior Publication Data
US 2018/0118509 A1    May 3, 2018

(51) Int. Cl.
| B66B 1/16 | (2006.01) |
| B66B 1/46 | (2006.01) |
| H04M 1/725 | (2006.01) |
| B66B 1/24 | (2006.01) |

(52) U.S. Cl.
CPC ......... B66B 1/468 (2013.01); H04M 1/72577 (2013.01); *B66B 1/2408* (2013.01); *B66B 2201/401* (2013.01); *B66B 2201/4653* (2013.01); *B66B 2201/4676* (2013.01); *B66B 2201/4684* (2013.01)

(58) Field of Classification Search
CPC . B66B 1/468; B66B 1/2408; B66B 2201/401; B66B 2201/4653; B66B 2201/4676; B66B 2201/4684; H04M 1/72577

USPC ....................................................... 187/381
See application file for complete search history.

(56) References Cited

U.S. PATENT DOCUMENTS

| 7,377,364 B2 | 5/2008 | Tyni et al. |
| 8,136,636 B2 | 3/2012 | Bahjat et al. |
| 8,151,942 B2 | 4/2012 | Rusanen et al. |
| 8,544,612 B2 | 10/2013 | Korhonen et al. |
| 8,651,242 B2 | 2/2014 | Sarjanen et al. |
| 8,744,754 B2 | 6/2014 | Kappeler et al. |
| 8,813,917 B2 | 8/2014 | Salmikuukka et al. |

(Continued)

FOREIGN PATENT DOCUMENTS

| CN | 104760851 A | 7/2015 |
| WO | 031490 A1 | 2/2003 |

(Continued)

OTHER PUBLICATIONS

Extended European Search Report for Application No. 17198893.4; Report Issued Date: May 4, 2018; Report Received Date: May 18, 2018; 1-9 pages.

(Continued)

*Primary Examiner* — Jeffrey Donels
(74) *Attorney, Agent, or Firm* — Cantor Colburn LLP

(57) ABSTRACT

A method of managing mobile elevator call requests from a mobile device is provided. The method includes: receiving an elevator call parameter from a management interface; receiving at least one mobile elevator call request from a mobile device; comparing the mobile elevator call request to the elevator call parameter; and restricting the mobile device from sending additional mobile elevator call requests when the mobile elevator call request conflicts with the elevator call parameter.

17 Claims, 6 Drawing Sheets

(56) References Cited

U.S. PATENT DOCUMENTS

| | | | |
|---|---|---|---|
| 9,016,440 B2 | 4/2015 | Finschi et al. | |
| 9,469,502 B2 | 10/2016 | Parkkinen et al. | |
| 2007/0025315 A1* | 2/2007 | Gerstenkorn | G07C 9/00309 |
| | | | 370/342 |
| 2014/0231185 A1 | 8/2014 | Salmikuukka et al. | |
| 2016/0009525 A1 | 1/2016 | Depaola et al. | |
| 2016/0355375 A1* | 12/2016 | Simcik | B66B 1/468 |
| 2017/0134894 A1* | 5/2017 | Simcik | H04W 4/02 |
| 2017/0243417 A1* | 8/2017 | Manikantan Shila | |
| | | | H04W 12/06 |
| 2017/0291795 A1* | 10/2017 | Scoville | B66B 1/468 |
| 2017/0300820 A1* | 10/2017 | Raitola | B66B 1/3461 |

FOREIGN PATENT DOCUMENTS

| | | |
|---|---|---|
| WO | 2014116182 A1 | 7/2014 |
| WO | 2014178790 A1 | 11/2014 |
| WO | 2015084396 A1 | 6/2015 |

OTHER PUBLICATIONS

KONE, "KONE Remote Call", available at https://play.google.com/store/apps/details?id=com.kone.mop, accessed Jan. 31, 2017, 3 pages.

Otis, "Otis eCall", available at https://play.google.com/store/apps/details?id=otis.mobile.ecall, accessed Jan. 31, 2017, 3 pages.

\* cited by examiner

ELEVATOR ACTIVITY LEVEL MANAGEMENT OF MOBILE DEVICE ACCESS

BACKGROUND

The subject matter disclosed herein generally relates to the field of elevators, and more particularly to an apparatus and method for summoning elevator cars within an elevator system.

Existing elevator systems allow a user to submit a mobile elevator call request (e.g., a hall call or a destination call) using a mobile device (e.g., a smartphone, smart watch, tablet, etc.). There is a potential risk for both intentional and unintentional overuse of the system that may flood the elevator system with too many mobile elevator call requests, which would make efficiently operating the elevator system difficult. A system to prevent abusive use of the mobile elevator call requests is greatly desired.

BRIEF SUMMARY

According to one embodiment, a method of managing mobile elevator call requests from a mobile device is provided. The method includes: receiving an elevator call parameter from a management interface; receiving at least one mobile elevator call request from a mobile device; comparing the mobile elevator call request to the elevator call parameter; and restricting the mobile device from sending additional mobile elevator call requests when the mobile elevator call request conflicts with the elevator call parameter.

In addition to one or more of the features described above, or as an alternative, further embodiments of the method may include activating an overuse alarm on the mobile device when the mobile elevator call request conflicts with the elevator call parameter.

In addition to one or more of the features described above, or as an alternative, further embodiments of the method may include that the mobile device is restricted from sending additional mobile elevator call requests for a selected timeout period when the mobile elevator call request conflicts with the elevator call parameter.

In addition to one or more of the features described above, or as an alternative, further embodiments of the method may include that the elevator call parameters are at least one of specific mobile device applicability and general mobile device applicability.

In addition to one or more of the features described above, or as an alternative, further embodiments of the method may include that the elevator call parameters include a selected number of mobile elevator call requests per a selected period of time for the mobile device.

In addition to one or more of the features described above, or as an alternative, further embodiments of the method may include that the elevator call parameters include a selected time of day for the elevator call parameters to apply.

In addition to one or more of the features described above, or as an alternative, further embodiments of the method may include that the elevator call parameters include a selected number of active mobile elevator call requests.

In addition to one or more of the features described above, or as an alternative, further embodiments of the method may include that the mobile elevator call request is compared to the elevator call parameter using at least one of an elevator system controller and the mobile device.

In addition to one or more of the features described above, or as an alternative, further embodiments of the method may include registering a mobile device with the management interface.

According to another embodiment, an elevator system controller is provided. The elevator system controller including: a processor; a memory comprising computer-executable instructions that, when executed by the processor, cause the processor to perform operations. The operations include: receiving an elevator call parameter from a management interface; receiving a mobile elevator call request from a mobile device; comparing the mobile elevator call request to the elevator call parameter; and restricting the mobile device from sending additional mobile elevator call requests when the mobile elevator call request conflicts with the elevator call parameter.

In addition to one or more of the features described above, or as an alternative, further embodiments of the elevator system controller may include that the operations further include activating an overuse alarm on the mobile device when the mobile elevator call request conflicts with the elevator call parameter.

In addition to one or more of the features described above, or as an alternative, further embodiments of the elevator system controller may include that the mobile device is restricted from sending additional mobile elevator call requests for a selected timeout period when the mobile elevator call request conflicts with the elevator call parameter.

In addition to one or more of the features described above, or as an alternative, further embodiments of the elevator system controller may include that the elevator call parameters are at least one of specific mobile device applicability and general mobile device applicability.

In addition to one or more of the features described above, or as an alternative, further embodiments of the elevator system controller may include that the elevator call parameters include a selected number of mobile elevator call requests per a selected period of time for the mobile device.

In addition to one or more of the features described above, or as an alternative, further embodiments of the elevator system controller may include that the elevator call parameters include a selected time of day for the elevator call parameters to apply.

In addition to one or more of the features described above, or as an alternative, further embodiments of the elevator system controller may include that the elevator call parameters include a selected number of active mobile elevator call requests.

In addition to one or more of the features described above, or as an alternative, further embodiments of the elevator system controller may include that the operations further include registering a mobile device with the management interface.

According to another embodiment, a computer program product tangibly embodied on a computer readable medium is provided. The computer program product including instructions that, when executed by a processor, cause the processor to perform operations including: receiving an elevator call parameter from a management interface; receiving a mobile elevator call request from a mobile device; comparing the mobile elevator call request to the elevator call parameter; and restricting the mobile device from sending additional mobile elevator call requests for a selected timeout period when the mobile elevator call request conflicts with the elevator call parameter.

In addition to one or more of the features described above, or as an alternative, further embodiments of the computer program may include that the operations further include activating an overuse alarm on the mobile device when the mobile elevator call request conflicts with the elevator call parameter.

In addition to one or more of the features described above, or as an alternative, further embodiments of the computer program may include that the operations further include registering a mobile device with the management interface.

Technical effects of embodiments of the present disclosure include the ability to manage mobile elevator call requests through a user interface.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

DETAILED DESCRIPTION

A detailed description of one or more embodiments of the disclosed apparatus and method are presented herein by way of exemplification and not limitation with reference to the Figures.

Figure 1:
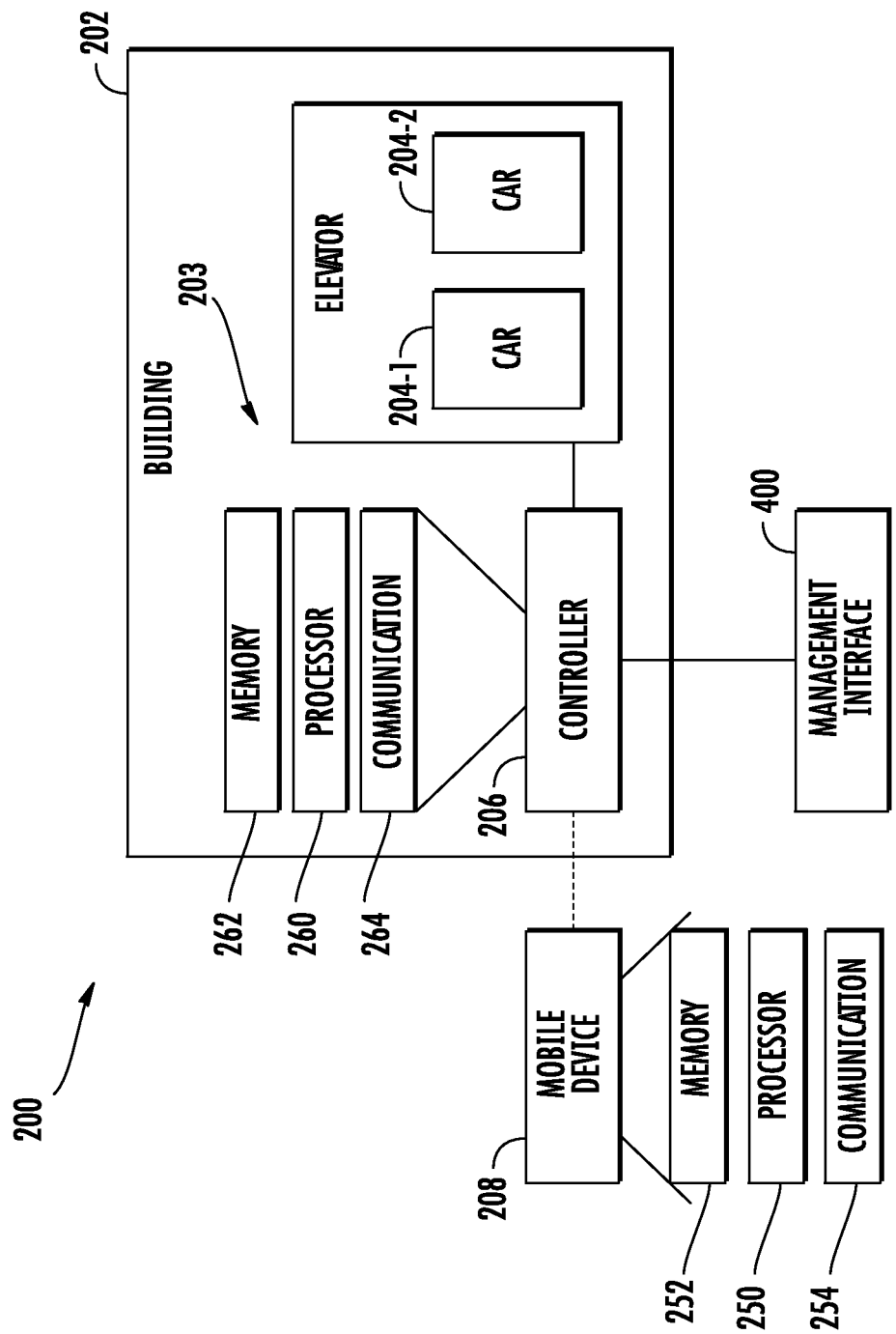
FIG. 1 illustrates a schematic view of a building elevator system, in accordance with an embodiment of the disclosure.

FIG. 1 depicts a building elevator system 200 in an example embodiment. The building elevator system 200 includes an elevator system 203 installed at a building 202. In some embodiments, the building 202 may be an office building or a collection of office buildings that may or may not be physically located near each other. The building 202 may include any number of floors. Persons entering the building 202 may enter at a lobby floor, and may go to a destination floor via one or more conveyance devices, such as an elevator system 203.

The elevator system 203 may include one or more computing devices, such as a controller 206. The controller 206 may be configured to control dispatching operations for one or more elevator cars (e.g., elevator cars 204-1, 204-2) associated with the elevator system 203. It is understood that the elevator system 203 may utilize more than one controller 206, and that each controller may control a group of elevators cars 204-1 and 204-2. Although two elevator cars 204-1 and 204-2 are shown in FIG. 1, it is understood that any number of elevators cars may be used in the elevator system 203. The elevator cars 204-1 and 204-2 may be located in the same hoistway or in different hoistways so as to allow coordination amongst elevator cars 204-1 and 204-2 in different elevator banks serving different floors. It is understood that other components of the elevator system 203 (e.g., drive, counterweight, safeties, etc.) are not depicted for ease of illustration.

The controller 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the controller 206 including executable instructions stored therein, for instance, as firmware. The communication module 264 may implement one or more communication protocols as described in further detail herein.

Also shown in FIG. 1 is a mobile device 208. The mobile device 208 may include a device that is typically carried by a person, such as a phone, PDA, smart watch, tablet, laptop, etc. The mobile device 208 may include a processor 250, memory 252 and communication module 254 as shown in FIG. 1. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the mobile device 208 including executable instructions stored therein, for instance, as firmware. The communication module 254 may implement one or more communication protocols as described in further detail herein.

The mobile device 208 and the controller 206 communicate with one another. For example, the mobile device 208 and the controller 206 may communicate with one another when proximate to one another (e.g., within a threshold distance). The mobile device 208 and the controller 206 may communicate over a wireless network, such as 802.11x (WiFi), short-range radio (Bluetooth), etc. In some embodiments, the controller 206 may include, or be associated with (e.g., communicatively coupled to) a networked element, such as kiosk, beacon, hall call fixture, lantern, bridge, router, network node, etc. The networked element may communicate with the mobile device 208 using one or more communication protocols or standards. For example, the networked element may communicate with the mobile device 208 using near field communications (NFC). In other embodiments, the controller 206 may establish communication with a mobile device 208 that is outside of the building 202. This connection may be established with various technologies including GPS, triangulation, or signal strength detection, by way of non-limiting example. Such technologies that allow early communication will provide users and the systems more time to establish the most efficient passenger flow, and may eliminate the need for a user to stop moving to interact with the system. In example embodiments, the mobile device 208 communicates with the controller 206 over multiple independent wired and/or wireless networks. Embodiments are intended to cover a wide variety of types of communication between the mobile device 208 and controller 206, and embodiments are not limited to the examples provided in this disclosure.

Figure 2:
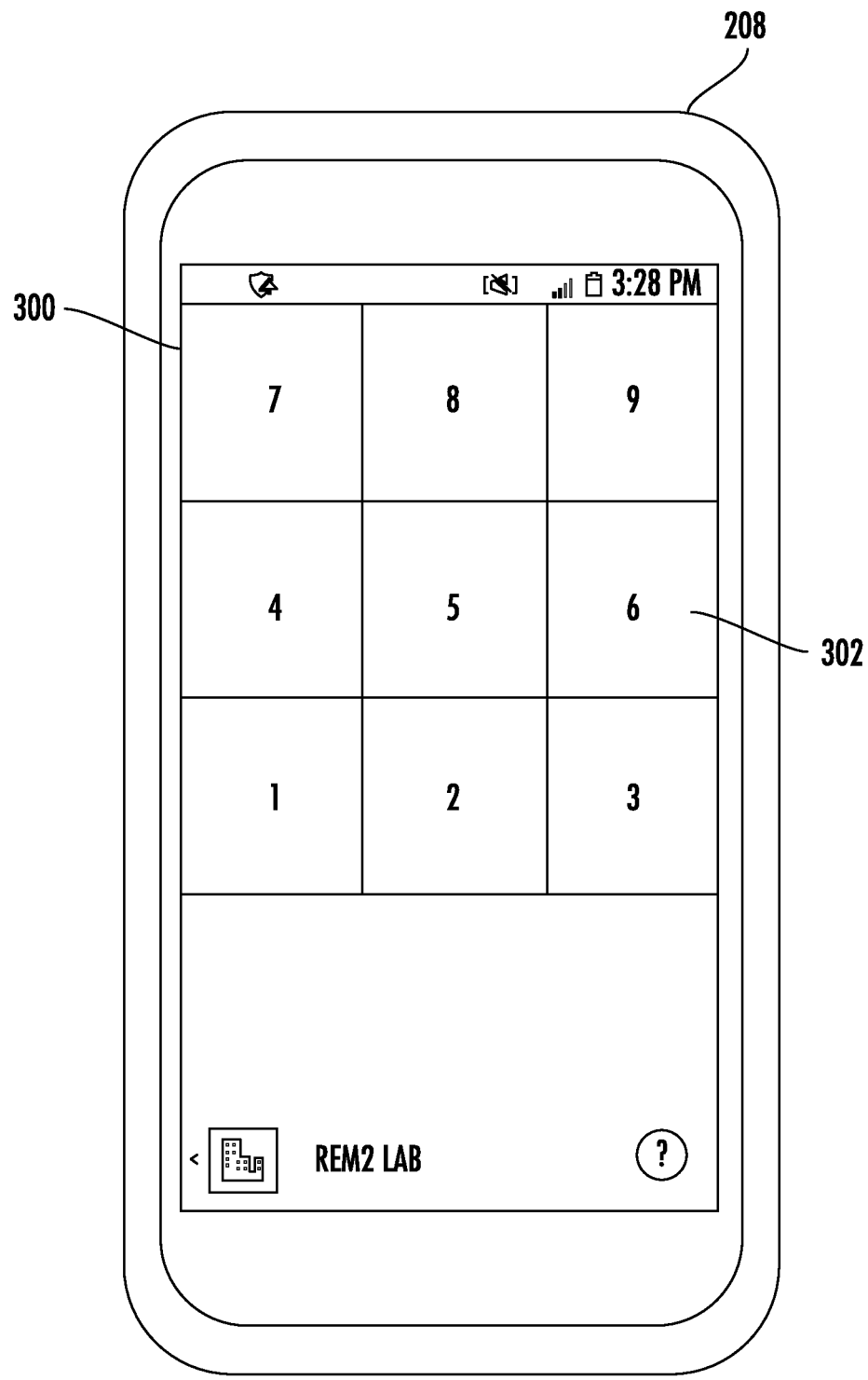
FIG. 2 depicts a user interface on a mobile device, in accordance with an embodiment of the disclosure.
Figure 3:
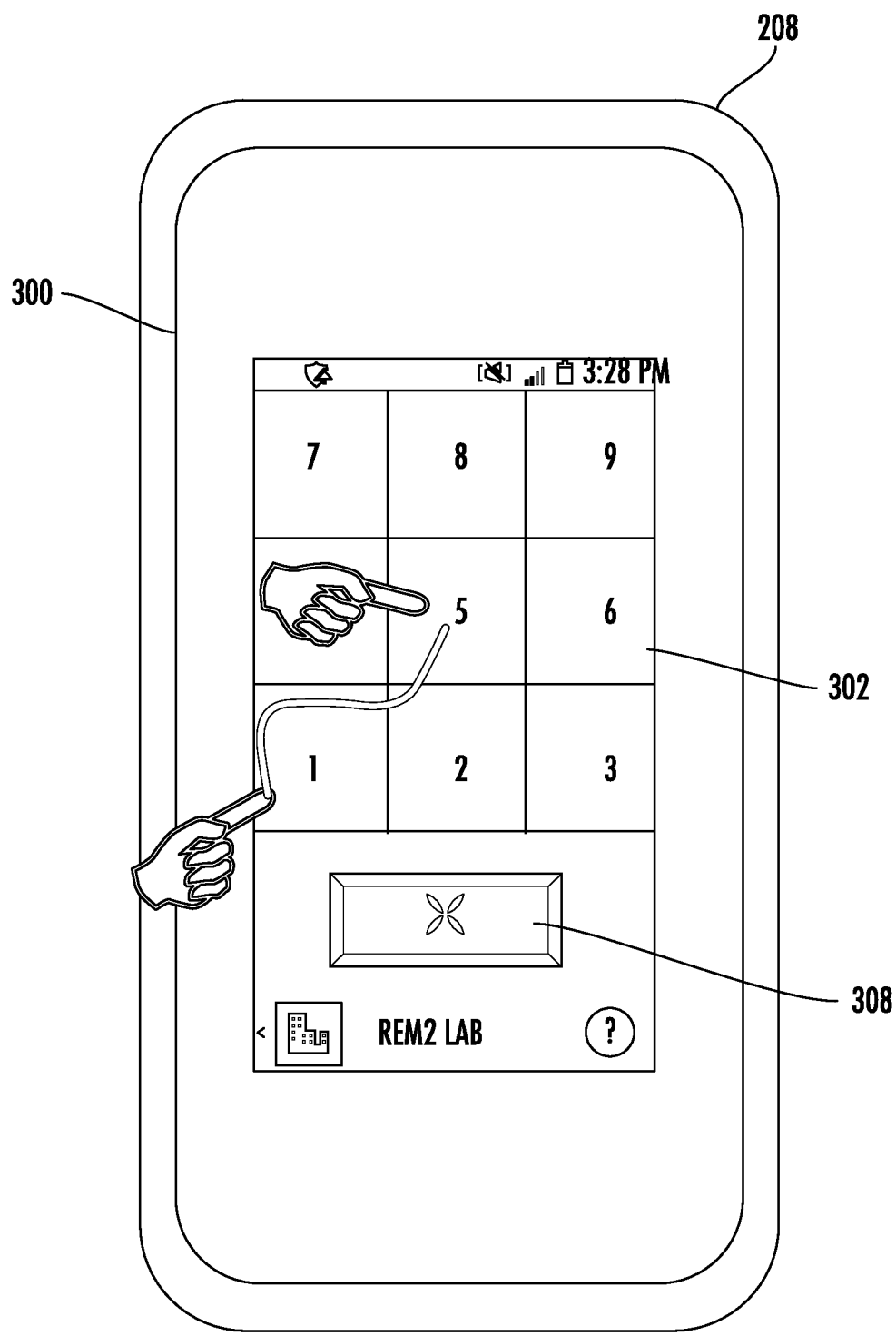
FIG. 3 depicts a user interface on a mobile device, in accordance with an embodiment of the disclosure.
Figure 5:
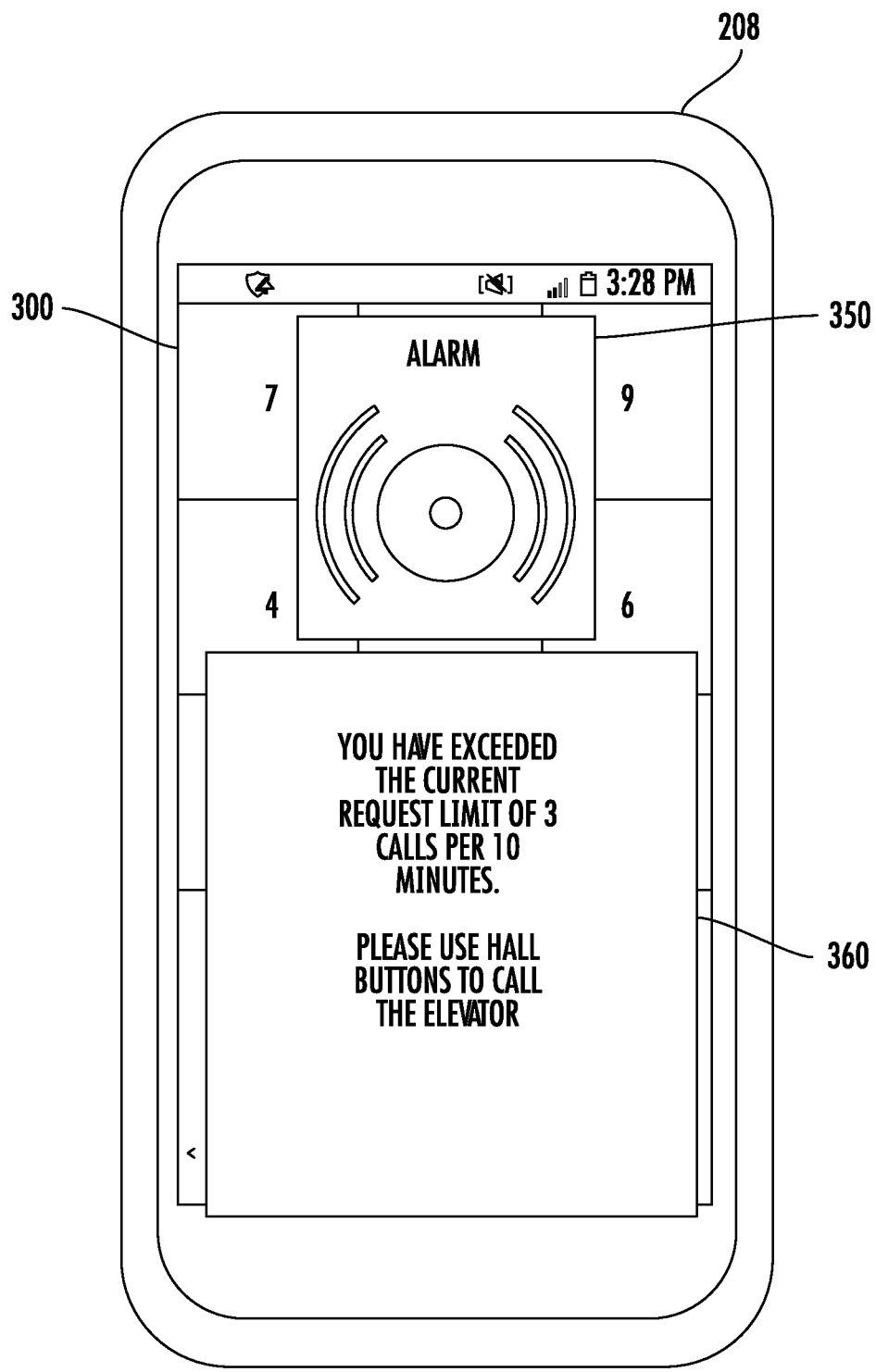
FIG. 5 depicts a user interface on a mobile device, in accordance with an embodiment of the disclosure.

Embodiments generate a user interface on the mobile device 208. FIGS. 2-3 and 5 depict an example user interface 300 on mobile device 208. Referring to FIG. 2, when the mobile device 208 launches an elevator interface application, a mobile elevator call request entry screen may be presented as shown in FIG. 2. The mobile elevator call request entry screen allows a user to enter a mobile elevator call request, such as a hall call or a destination call. A user interface 300 includes a plurality of floor icons 302, each floor icon 302 corresponding to a single floor of the building 202. The user can enter a destination call by selecting a starting floor and ending floor, as shown in FIG. 3. As shown in FIG. 3, the user has selected floor 1 as a starting floor and floor 5 as a destination floor. The particular user interface depicted in FIGS. 2 and 3 is an example. Any other desired user interface enabling a user to select a start and destination floor pairing, destination floor, preset mobile elevator call request, or any other manner of indicating the desired travel path may be used. The mobile elevator call request is communicated from the mobile device 208 to the controller 206. The controller 206 may use existing elevator dispatch techniques to determine which elevator car 204 (e.g., one of 204-1 or 204-2) will serve the mobile elevator call request. Once the user has placed an elevator call, the user interface 300 may display a graphic cancel icon 308, upon selection of which the mobile elevator call request may be canceled.

Also shown in FIG. 1 is a management interface 400 in operative communication with the controller 206. The management interface may be a website and/or computer application. The management interface 400 may be implemented using known input/output devices which may include one or more of a keyboard or keypad, a key switch, a touchscreen or touch panel, a display screen, a microphone, a speaker, a mouse, a button, a computer, a tablet, a smartwatch, a remote control, a joystick, a printer, a telephone or mobile device (e.g., a smartphone), etc. In one embodiment, the management interface 400 may be in wired connection to the controller 206. In a second embodiment, the management interface 400 may be remote from the controller 206 and in operative communication with the controller 206 through a network connection (e.g., wired and/or wireless).

Figure 4:
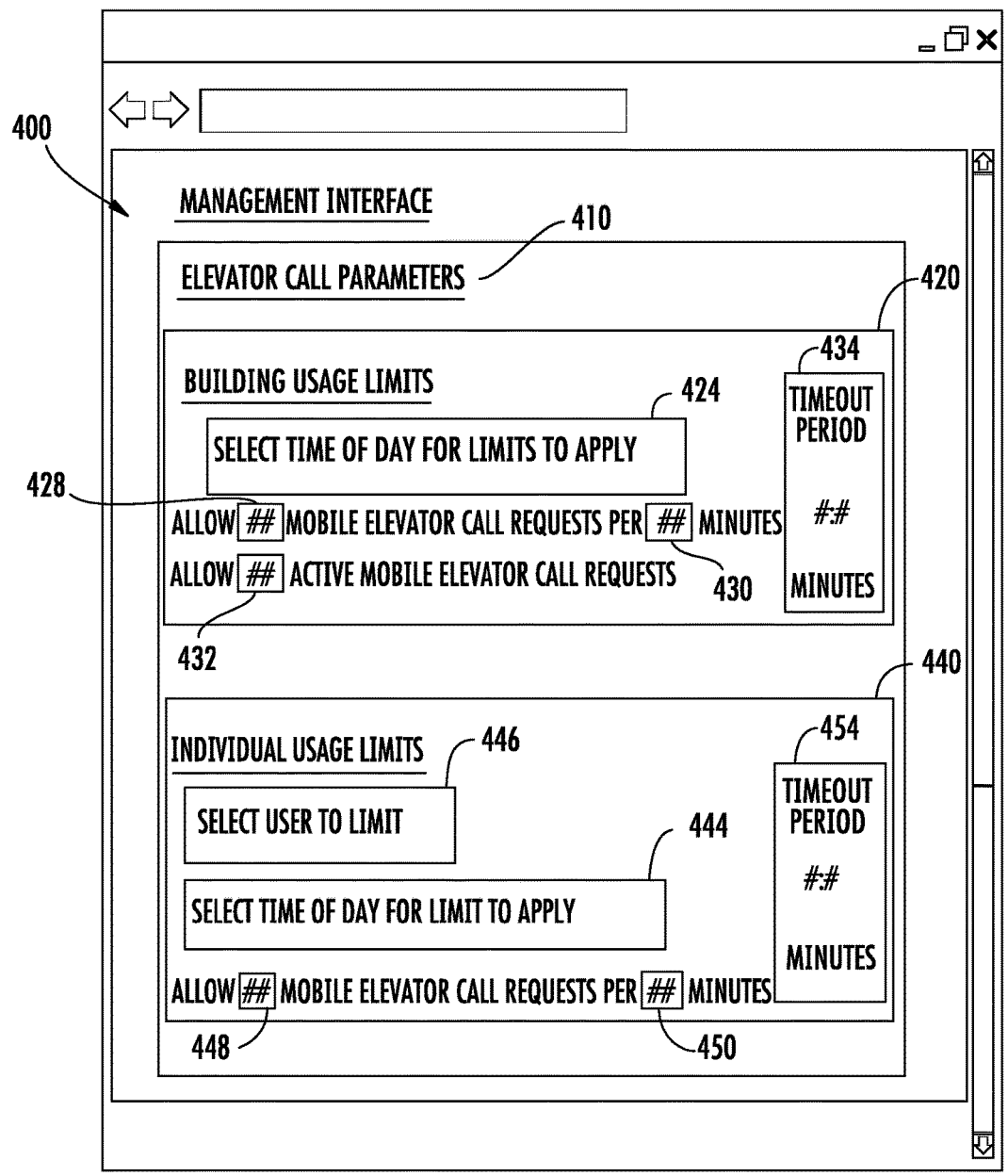
FIG. 4 depicts a management interface, in accordance with an embodiment of the disclosure.

FIG. 4 depicts an example management interface 400, in accordance with an embodiment of the disclosure. As shown in FIG. 4, the management interface 400 includes elevator call parameters 410 that may be adjusted by a user, such as for example a building manager. In one embodiment, the call parameters 410 may be adjusted at the factory, in the field by an elevator service technician, or any other authorized user. The building manager (or other authorized user) may input their desired elevator call parameters 410 for the building elevator system 200. The elevator call parameters 410 are input into the management interface 400 and received by the controller 206. The elevator call parameters 410 place limits on the number of elevators call requests that may be sent from a mobile device 208. In an embodiment, each mobile device 208 must first register with the management interface 400 to send a mobile elevator call request. The elevator call parameters 410 may comprise building usage limits 420 and individual usage limits 440. The building usage limits 420 comprise elevator call parameters 410 that are general mobile device applicability, meaning that they apply to each mobile device 208 equally. For example, under general mobile device applicability each mobile device 208 may be limited to three mobile elevator call requests within ten minutes. In one embodiment, the limit and time interval may apply to the whole elevator system 203, rather than phones. For example, the system could limit to a total of 20 mobile elevator call requests from all mobile devices in any 10 minute period. The individual usage limits 440 comprise elevator call parameters 410 that are specific mobile device applicability, meaning that they can be applied to a specific user's mobile device. For instance, the CEO of a company may have unlimited mobile elevator call requests from their mobile device, whereas a regular employee may be limited to three mobile elevator call requests within ten minutes. It should be understood that any number of calls and any duration may be used.

As seen in FIG. 4, the building usage limits 420 may include a selected time of day 424 for the elevator call parameters 410 to apply. For instance, the building manager may desire to place increased limits on mobile elevator call requests during high elevator use times and then ease the limits during low elevator use times, or vice versa. For example, in one exemplary embodiment, during the morning rush hour, the elevator call parameter 410 may be set to only two mobile elevator call requests per ten minutes, whereas in the middle of the night the elevator call parameters 410 may be set to unlimited mobile elevator call requests. Under the building usage limits 420, the building manager could input a selected number of mobile elevator call requests 428 per a selected period of time 430, which would apply to each mobile device 208 registered. For instance, each mobile device 208 may be limited to three mobile elevator call requests per ten minutes. Further, the building manager could also input a selected number of active mobile elevator call requests 432, which would limit how many mobile elevator call requests in total the controller 206 can be active at any given time. The distinction between active calls and total calls is that total calls reflects the total calls during a predetermined time period whereas active calls refers to the total number of outstanding calls at a particular instant in time. Advantageously, this limit on the total mobile elevator call request will help ensure that the controller 206 does not get overloaded and continues to operate efficiently. The controller 206 may limit active calls and/or total calls as described above.

As seen in FIG. 4, the individual usage limits 440 include the opportunity to select an individual user to limit 446. As mentioned above, this allows the building manager through the management interface 400 to tailor the elevator call parameters 410 to the needs of each individual user. The individual usage limits 440 may also include a selected time of day 444 for the elevator call parameters 410 to apply. For instance, the building manager may desire to place decreased limits on mobile elevator call requests during a specific employee's work schedule and then increase the mobile elevator call request limits when the employee is not scheduled to work. Under the individual usage limits 420, the building manager could input a selected number of mobile elevator call requests 448 per a selected period of time 450 for each employee. For instance, the select number of mobile elevator call requests 448 may be high for an employee who uses the elevator a lot during the day.

As shown in FIG. 5, if a mobile elevator calls request conflicts with an elevator call parameter 410, an overuse alarm 350 is activated on the mobile device 208. The overuse alarm 350 may also be transmitted to the mobile device from the controller 206. The overuse alarm 350 may be audible, visual, and/or vibratory. The overuse alarm may include explanatory text 360 explaining what caused the overuse alarm 350 and directing the user of the mobile device 208 to now use the hall buttons to call the elevator. In one example, the explanatory text 360 may state, "You have exceeded the current request limit of 3 calls per 10 minutes. Please Use Hall buttons to call the elevator". Further, in an embodiment, the mobile device 208 may be restricted from sending additional mobile elevator call requests when the elevator call conflicts with the elevator call parameters 410. The mobile device 208 may be restricted by the controller 206 or the mobile device 208 itself. Further, the mobile device 208 may be restricted from sending additional mobile elevator call requests for a selected timeout period 434, 454 (see FIG. 4) when the elevator call conflicts with the elevator call parameters 410. The selected timeout period 434, 454 may be a period of time where the mobile device 208 would not be able to send mobile elevator call requests, such as, for example, one hour. As may be appreciated by one of skill in the art, the selected timeout period 434, 454 may be less than or greater than one hour. The selected timeout period 434, 454 may be entered into the management interface 400. Additionally, the selected timeout period 434 may be building specific and entered under the building usage limits 420 or the selected time out period 454 may be user specific and entered under the individual usage limits 440, as seen in FIG. 4.

Figure 6:
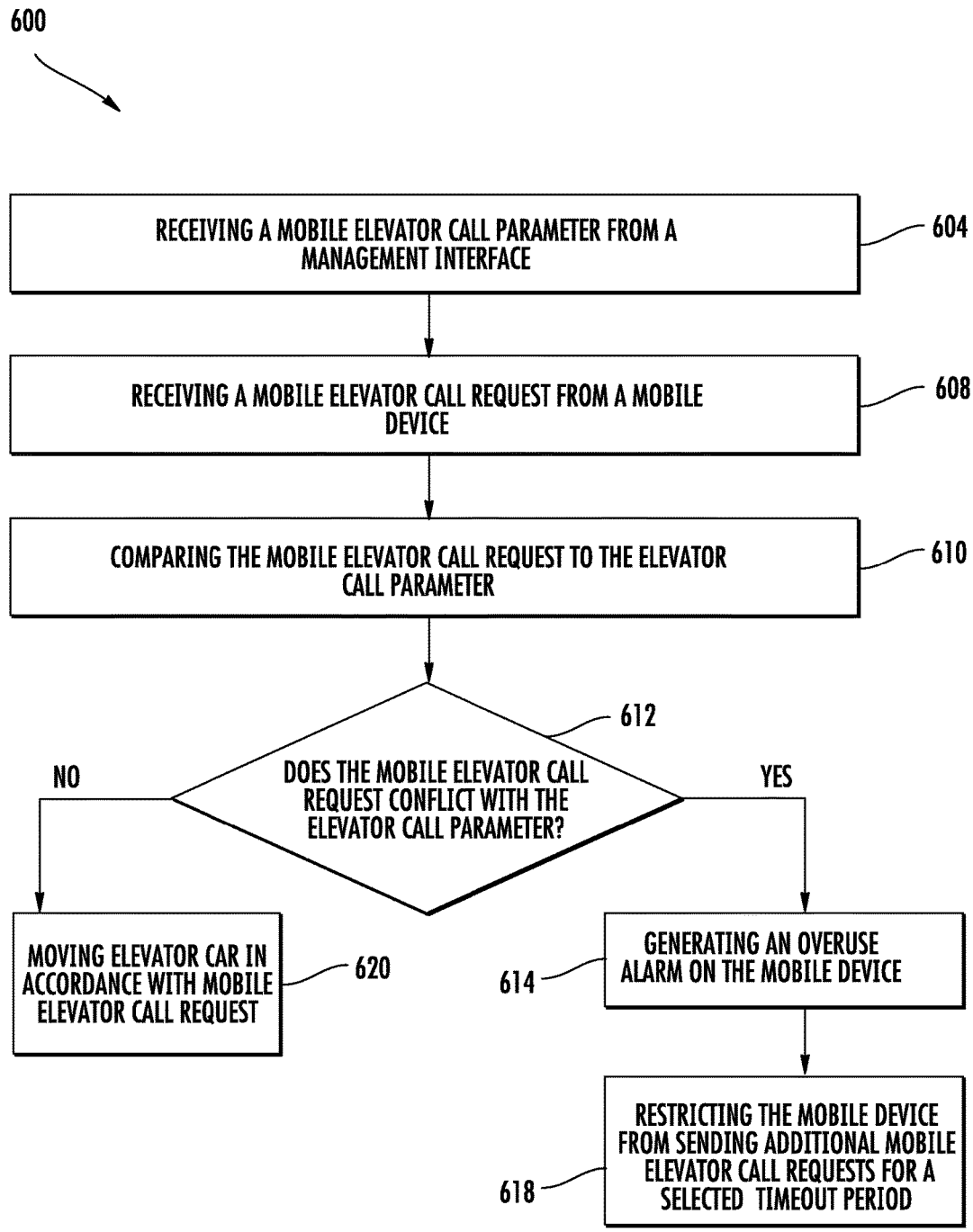
FIG. 6 is a flow diagram illustrating a method of managing mobile elevator call requests, according to an embodiment of the present disclosure.

Referring now to FIG. 6, while referencing components of FIGS. 1-5. FIG. 6 shows a flow chart of method 600 of managing mobile elevator call requests from a mobile device 208, in accordance with an embodiment of the disclosure. At block 604, an elevator call parameter 410 is received from a management interface 400. At block 608, a mobile elevator call request is received from a mobile device 208. At block 610, the mobile elevator call request is compared to the elevator call parameter 410. At block 612, it is checked whether the mobile elevator call request conflicts with the elevator call parameter 410, which may be done by either the mobile device 208 or the controller 206. At block 614, if the mobile elevator call request conflicts with the elevator call parameter 410 then an overuse alarm 350 is activated on the mobile device 206, at block 614. At block 618, the mobile device 208 is restricted from sending additional mobile elevator call requests when the elevator call conflicts with the elevator call parameters 410. As mentioned above, the mobile device 208 may be restricted by the controller 206 or the mobile device 208 itself. Further, the mobile device 208 may be restricted from sending additional mobile elevator call requests for a selected timeout period 434, 454 (see FIG. 4) when the elevator call conflicts with the elevator call parameters 410. At block 614, if the mobile elevator call request does not conflict with the elevator call parameter 410 then an elevator car is moved in accordance with the mobile elevator call request at block 620. The method may further include registering the mobile device 208 with the management interface 400, which will ensure that the management interface 400 could regulate the mobile elevator call requests from each mobile device 208.

While the above description has described the flow process of FIG. 6 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of managing mobile elevator call requests from a mobile device, the method comprising:
   receiving an elevator call parameter from a management interface;
   receiving at least one mobile elevator call request from a mobile device;
   comparing the mobile elevator call request to the elevator call parameter; and
   restricting the mobile device from sending additional mobile elevator call requests when the mobile elevator call request conflicts with the elevator call parameter,
   wherein the mobile device is restricted from sending additional mobile elevator call requests for a selected timeout period when the mobile elevator call request conflicts with the elevator call parameter.

2. The method of claim 1, further comprising:
   activating an overuse alarm on the mobile device when the mobile elevator call request conflicts with the elevator call parameter.

3. The method of claim 1, wherein:
   the elevator call parameters are at least one of specific mobile device applicability and general mobile device applicability.

4. The method of claim 1, wherein:
the elevator call parameters include a selected number of mobile elevator call requests per a selected period of time for the mobile device.

5. The method of claim 1, wherein:
the elevator call parameters include a selected time of day for the elevator call parameters to apply.

6. The method of claim 1, wherein:
the elevator call parameters include a selected number of active mobile elevator call requests.

7. The method of claim 1, wherein:
the mobile elevator call request is compared to the elevator call parameter using at least one of an elevator system controller and the mobile device.

8. The method of claim 1, further comprising:
registering a mobile device with the management interface.

9. An elevator system controller comprising:
a processor;
a memory comprising computer-executable instructions that, when executed by the processor, cause the processor to perform operations, the operations comprising:
receiving an elevator call parameter from a management interface;
receiving a mobile elevator call request from a mobile device;
comparing the mobile elevator call request to the elevator call parameter; and
restricting the mobile device from sending additional mobile elevator call requests when the mobile elevator call request conflicts with the elevator call parameter,
wherein the mobile device is restricted from sending additional mobile elevator call requests for a selected timeout period when the mobile elevator call request conflicts with the elevator call parameter.

10. The elevator system controller of claim 9, wherein the operations further comprise:
activating an overuse alarm on the mobile device when the mobile elevator call request conflicts with the elevator call parameter.

11. The elevator system controller of claim 9, wherein:
the elevator call parameters are at least one of specific mobile device applicability and general mobile device applicability.

12. The elevator system controller of claim 9, wherein:
the elevator call parameters include a selected number of mobile elevator call requests per a selected period of time for the mobile device.

13. The elevator system controller of claim 9, wherein:
the elevator call parameters include a selected time of day for the elevator call parameters to apply.

14. The elevator system controller of claim 9, wherein:
the elevator call parameters include a selected number of active mobile elevator call requests.

15. The elevator system controller of claim 9, wherein the operations further comprise:
registering a mobile device with the management interface.

16. A method of managing mobile elevator call requests from a mobile device, the method comprising:
receiving an elevator call parameter from a management interface;
receiving at least one mobile elevator call request from a mobile device;
comparing the mobile elevator call request to the elevator call parameter; and
restricting the mobile device from sending additional mobile elevator call requests when the mobile elevator call request conflicts with the elevator call parameter,
wherein the elevator call parameters include a selected number of mobile elevator call requests per a selected period of time for the mobile device.

17. A method of managing mobile elevator call requests from a mobile device, the method comprising:
receiving an elevator call parameter from a management interface;
receiving at least one mobile elevator call request from a mobile device;
comparing the mobile elevator call request to the elevator call parameter;
restricting the mobile device from sending additional mobile elevator call requests when the mobile elevator call request conflicts with the elevator call parameter; and
activating an overuse alarm on the mobile device when the mobile elevator call request conflicts with the elevator call parameter.

* * * * *